United States Patent
van den Brink et al.

(10) Patent No.: US 6,789,559 B2
(45) Date of Patent: Sep. 14, 2004

(54) PRESSURE REGULATOR

(75) Inventors: Peter John van den Brink, Driebergen (NL); Johannes Petrus de Jonge, Hilversum (NL); Klaas Hendrik Kroon, Calantsoog (NL)

(73) Assignee: Avantium International B.V. (NL)

( * ) Notice: Subject to any disclaimer, the term of this patent is extended or adjusted under 35 U.S.C. 154(b) by 0 days.

(21) Appl. No.: 10/177,291

(22) Filed: Jun. 21, 2002

(65) Prior Publication Data

US 2003/0015239 A1 Jan. 23, 2003

Related U.S. Application Data

(63) Continuation of application No. PCT/IB00/02025, filed on Dec. 22, 2000.

(30) Foreign Application Priority Data

Dec. 24, 1999 (EP) .............................................. 99310605

(51) Int. Cl.$^7$ .............................................. G05D 16/10
(52) U.S. Cl. .......................... 137/12; 137/494; 137/505; 137/505.18; 137/505.26
(58) Field of Search .............................. 137/494, 505.41

(56) References Cited

U.S. PATENT DOCUMENTS

| | | | | |
|---|---|---|---|---|
| 622,385 | A | * 4/1899 | Oliver ................... | 137/115.15 |
| 2,597,582 | A | * 5/1952 | Gruss ........................ | 137/494 |
| 4,515,183 | A | * 5/1985 | Reiffert et al. .......... | 137/625.21 |
| 4,619,115 | A | 10/1986 | Weber ........................ | 137/489 |
| 4,682,622 | A | 7/1987 | Weber ........................ | 137/489 |
| 4,971,104 | A | 11/1990 | Weber ..................... | 137/489.5 |
| 5,913,330 | A | * 6/1999 | Jones et al. .............. | 137/493.8 |

FOREIGN PATENT DOCUMENTS

| | | |
|---|---|---|
| FR | 1237237 | 11/1960 |
| FR | 1423190 | 3/1966 |
| FR | 1458509 | 1/1967 |

* cited by examiner

Primary Examiner—Stephen M. Hepperle
(74) Attorney, Agent, or Firm—Hoffmann & Baron LLP

(57) ABSTRACT

A fluid pressure regulator is provided having a housing with an inlet and outlet for fluid, a valve located movably inside the housing and provided with a fluid transport member to allow passage of fluid from the inlet to the outlet. The regulator also has a pressure setting member and a space defined by one end of the valve and an end wall of the housing. The valve is moveable relative to the housing in response to a change in pressure within the space between a first position which at least partially aligns the fluid transport member with each of the inlet and the outlet and a second position in which there is no alignment of the fluid transport member with at least one of the inlet and the outlet. A passage is provided in open communication with the space and one of the inlet, the outlet, and the transport member. Methods of using the pressure regulator are also provided.

25 Claims, 4 Drawing Sheets

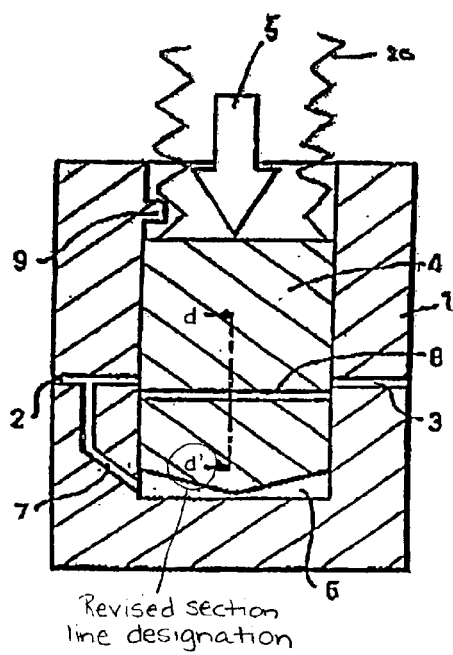
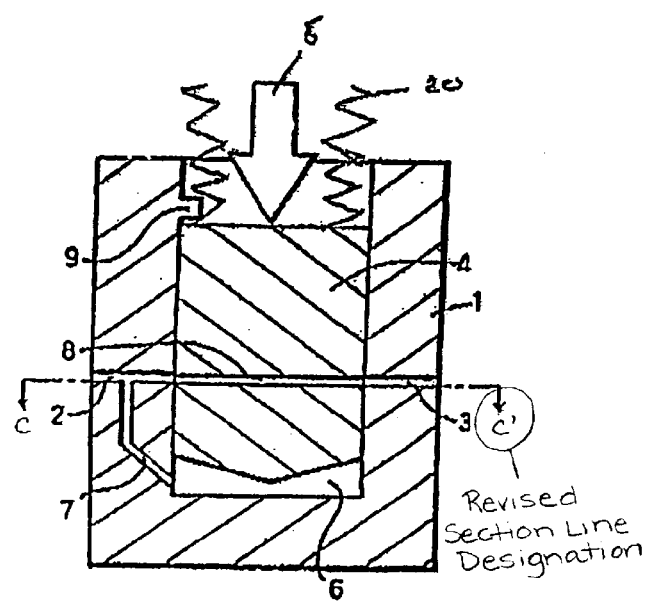
Fig. 1a
Fig. 1b
Revised section line designation
Revised Section Line Designation
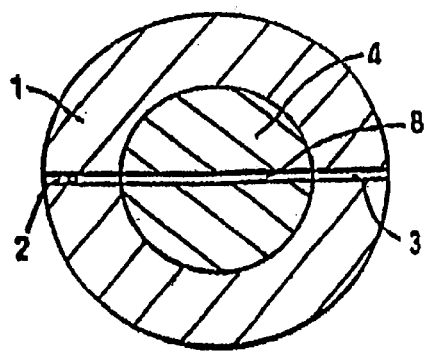
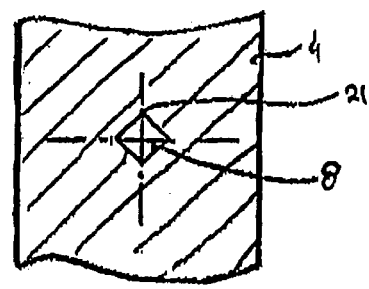
Fig. 1c
Fig. 1d Revised
Section line
Placement Fig.4a
Fig.4b
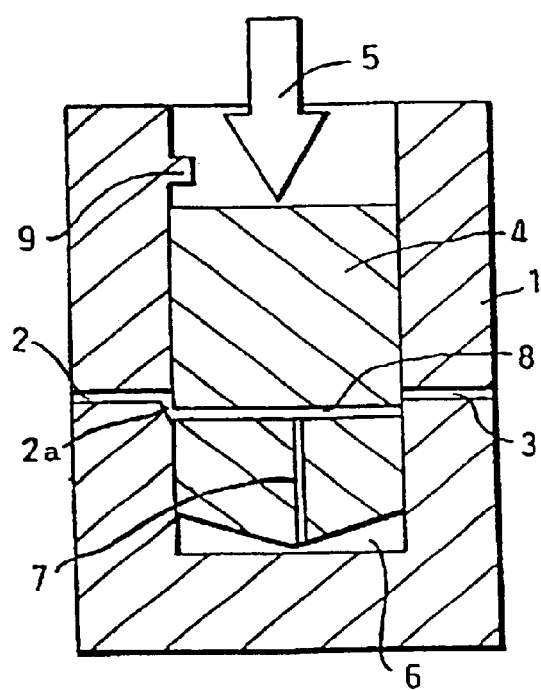
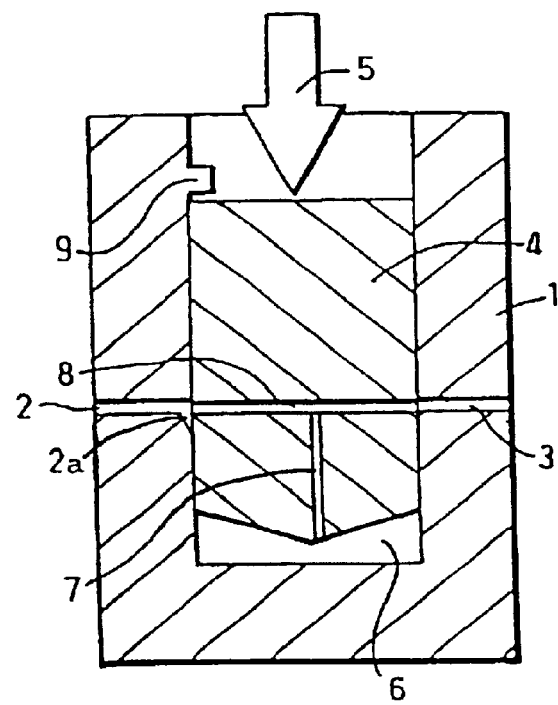

PRESSURE REGULATOR

CROSS-REFERENCE TO RELATED APPLICATION

This is a continuation application of PCT/IB00/02025 filed Dec. 22, 2000, which PCT application claims the priority of European patent application 99310605.3 filed Dec. 24, 1999, both herein incorporated by reference.

FIELD OF THE INVENTION

The present invention relates to a novel pressure regulator, in particular to a back-pressure regulator, as well as to a process for regulating the pressure in a reactor system by using a pressure regulator in accordance with the present invention. The pressure regulator according to the present invention may be used to regulate normal pressure as well as back-pressure. In the text which follows, the term (back)-pressure regulator will sometimes be used to denote a pressure regulator capable of operating in either of these two modes.

BACKGROUND OF THE INVENTION

It is well known in industry to operate plant processes under pressure, when it is desired to maintain components of the system at a certain pressure whilst a reaction is carried out. For example, in a hydrogenation process, high pressure hydrogen is available from a storage vessel at a pressure well above the working pressure required in the process. The flow of hydrogen emerging from the storage vessel, suitably a cylinder containing hydrogen under high pressure, say initially at 10 MPa (100 bar), is normally reduced to a lower value, say 1 MPa (10 bar), to prevent pressure waves being formed in the system. The flow can be fine-tuned to the actual flow needed in the reactor by means of a flow control valve. Such flow control valves will be referred to in the text which follows as pressure regulators. They can operate in a closed system or in a vented, one-phase system.

In order to keep the environment of the reactor vessel at the required pressure (for example 500 kPa (5 bar)), it is necessary to install a so-called back-pressure regulator downstream of the reactor environment. The back-pressure regulator must be capable of maintaining the pressure in the reactor at the required level. In practice, this means that the pressure regulator device must be capable of reducing or even closing off the passage of gas or liquid in a conduit downstream of the reactor until the pressure has returned to the required level. Conversely, the pressure regulator should also be capable of relieving the pressure by opening the conduit downstream of the reactor, to the extent required to return the pressure in the reactor vessel to the desired level by allowing passage of gas or liquid through the downstream conduit. A back-pressure regulator can also be used in systems which contain reactants, such as hydrogen, that will be consumed, or in systems in which higher pressures may be generated by the production of gases in the reaction, or due to the exothermicity of the subject reaction, causing the pressure to increase above the required level.

In some processes, the operator will be faced with a fluid containing both gaseous and liquid components, each contributing to the total pressure in the system. The partial pressures of the gaseous and liquid components will be dependent on the type of reaction(s) envisaged. In the context of this specification, the expression "fluid" will be used to denote materials either in the gaseous phase or in the liquid phase, or mixtures of the two phases, as the case may be.

A well-known problem in industry is that it is difficult to separate gaseous and liquid components in circumstances in which it is required to maintain the total pressure at a pre-determined level, especially in systems in which a multitude of vessels is involved, or when dealing with systems in which rather small volumes are present. One solution is to introduce a knock-out vessel in the conduit downstream of the reactor. This vessel can be equipped with a sluice system in order to drain off liquid. This allows the use of a standard gas-phase back-pressure regulator to deal with the setting of the pressure level of the gaseous components still present. In this respect, reference is made to U.S. Pat. Nos. 4,619,115; 4,682,622 and 4,971,104.

A plug valve is known from French Patent No. 1,237,237 which relies on annular seals for ensuring leak-tight cooperation between the valve and the cylindrical body which encloses it. The drawback of this known plug valve is that the seals are inevitably exposed to the fluids in the reactor stream and are susceptible to deterioration when contacted by aggressive chemicals.

Standard back-pressure regulators are operated by adjusting the flow through the conduit by increasing or decreasing the area through which the fluid travels by mechanical, pneumatic, electrical or any other means which is capable of adjusting the throughput to the required level. Systems based on springs or bellows may suitably be applied.

Turning now to systems which are designed to operate with small reactor volumes, typically operating with a throughput of 5 ml/minute or less, in particular systems operating under a flow regime of less than 0.5 ml/minute, it has been found that it is very difficult to control the back-pressure reliably, even for systems in which only one phase (either gaseous or liquid) is present. These difficulties are compounded for systems in which two phases (gaseous and liquid) are present. The option of introducing a knock-out sluice system is not possible in systems operating with such small reactor volumes because the size of the equipment is so small that fitting a vessel and a sluice device is no longer feasible. Morever, such systems suffer from the presence of so-called "dead volumes" which have a further disadvantage in that they cause significant dead time before the reaction products (or effluent) reach downstream analytical equipment. Moreover, dead volumes are prone to a build-up of sludge which hampers and eventually blocks the normal operation of the system. The proportion of "dead" volume in relation to the "active" volume increases as the trend towards more miniaturised systems is developed.

Morever, in systems using small reaction vessels and, in particular, in systems in which use is made of arrays of small reactors such as in the arrays currently envisaged for rapid catalyst screening, a number of additional problems need to be addressed. In particular, the consequences of operating at high temperatures (thermal expansion differentials) need to be taken into account. This, together with the high operating pressures that may be required, sets stringent requirements on the system in order to be able to operate in a leak-tight manner. Furthermore, in small reactor systems, small conduit systems will be used which are highly susceptible to external influences. This may have a significant effect on the process (or the screening) in actual operation. As mentioned above, the so-called "dead volume" which is nearly always present in valve systems becomes relatively large when down-scaling standard back-pressure regulators. This has an undesired influence on the working of the device.

OBJECTS OF THE INVENTION

It is therefore an object of the present invention to provide a pressure regulator which can overcome, or at least alleviate, the problems outlined above. It is also an object of the present invention to provide a pressure regulator which can operate in a single-phase and/or in a two-phase fluid system. It is a still further object of the invention to provide a pressure regulator which is self-regulating. It is yet another object of the invention to provide a pressure regulator which can operate as a normal pressure regulator and/or as a back-pressure regulator, depending on whether it is situated at a position upstream or downstream of the reactor vessel or any other part of the reactor system for which pressure regulation is required.

SUMMARY OF THE INVENTION

The invention is a fluid pressure regulator comprising a housing provided with an inlet and an outlet for fluids, a valve located movably inside the housing and provided with transport means to allow passage of fluids from an inlet side to an outlet side, a pressure setting means, and a passage in open communication between one of the inlet side, the outlet side or the transport means and a space enclosed by the housing and one end of the valve.

In particular, the present invention relates to a fluid back-pressure regulator which is placed downstream of the system through which it is intended to maintain a steady flow. The device is of particular use in a gas/liquid pressure environment which, hitherto, was impossible to control satisfactorily on a large scale, let alone on a small scale. The device is capable of operating reliably for a long time under severe reaction conditions, which is particularly advantageous when used in rapid screening duty for catalysts. Moreover, it can be manufactured at reasonable cost and enjoys operational robustness. In particular, the arrangement according to the present invention allows for chemical inertness in that there are no moving parts such as springs or O-rings exposed to the reaction environment and therefore susceptible to harm by aggressive chemicals. Most significantly, the pressure setting means can be isolated from the reaction environment, so the predetermined pressure at which the regulator actuates can be determined reliably because the pressure setting means will not be degraded by hazardous chemicals. The simplicity of the construction means that the pressure regulator according to the present invention is simple to machine and easy to assemble and dismantle. Maintenance is therefore straightforward and parts can be replaced easily, when required. Also, pressure regulators according to the present invention can be operated in such a manner that they are able to control a pressure difference, rather than absolute pressure. This increases sensitivity relative to many known devices.

BRIEF DESCRIPTION OF THE DRAWINGS

FIG. 1a is a cross-sectional view through a pressure regulator according to a first embodiment of the present invention, shown in a condition in which a through-path is closed off;

FIG. 1b is a cross-sectional view through the pressure regulator of FIG. 1a, shown in a condition allowing through-passage of fluids from the inlet to the outlet;

FIG. 1c is a cross-sectional view from above of the first embodiment depicted in the condition shown in FIG. 1b;

FIG. 1d is a cross-sectional view along section c–c' of the through-conduit of the valve of FIG. 1a.

FIG. 2b is a cross-sectional view on line bb☐ of the embodiment depicted in FIG. 2a;

FIG. 4a is a cross-sectional view of a fourth embodiment of the invention, shown in its closed condition, and FIG. 4b is a view similar to FIG. 4a but showing the fourth embodiment of pressure regulator according to the invention in an open condition.

DESCRIPTION OF PREFERRED EMBODIMENTS

Figure 2A:
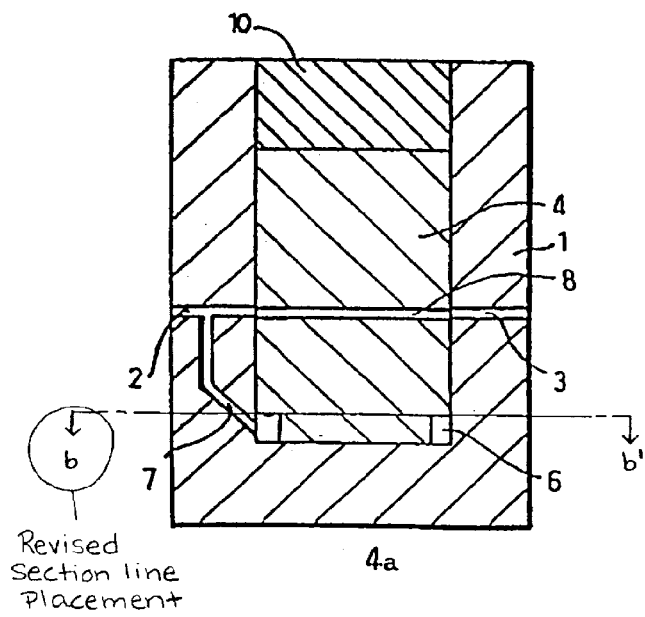
FIG. 2a is a cross-sectional view of a second embodiment of pressure regulator according to the invention.
Figure 2B:
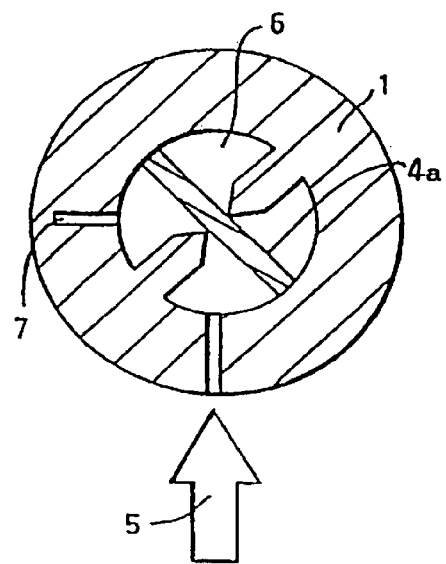

Returning now to FIG. 1a, there is depicted a back-pressure regulator comprising a cylindrical housing 1 having an inlet conduit 2 and an outlet conduit 3 which traverse the wall of the housing 1 and which are suitably disposed opposite one another, and bellows 20. A valve 4 is placed inside the housing and is movable relative to the housing 1 in a direction parallel to the longitudinal axis of the housing 1. As depicted in FIGS. 1a and 1b, this relative movement of the valve 4 within the housing 1 is essentially vertical up and down the plane of the page. However, it will be understood by persons skilled in the art that relative movement between the valve 4 and housing 1 is possible regardless of the particular orientation of the housing 1. The invention is not restricted to a device having this orientation, nor is its use limited to the orientation depicted in the drawings, which are for purposes of illustration only.

The valve 4 is maintained at a pre-determined level by a pressure setting means which exerts a force against a first end of the valve, as indicated by arrow 5.

The force exerted at arrow 5 can be actuated by any suitable operational force, such as pressure (e.g. by the use of bellows 20), mass, mechanical (e.g. by a spring) or electrical or electro-magnetic means. The second end of the valve 4 (the bottom of the valve 4 as depicted in FIGS. 1a and 1b) is configured in such a way that it forms a space 6 between the second end of the valve 4 and a base of the housing 1.

In the embodiment depicted in FIG. 1, the valve 4 is essentially cylindrical and the housing 1 defines a cylindrical bore which receives the valve 4. The second end of the valve 4 is tapered to a point and, when the operational force indicated by arrow 5 has no restoring force to counteract it, the pointed second end of the valve 4 will rest against the base of the housing 1.

The space 6 is in open communication with inlet 2 by means of a conduit 7.

Valve 4 includes a through-conduit 8 which is adapted to align with inlet 2 and outlet 3, thus allowing the passage of fluids through the back-pressure regulator when the disposition of the valve 4 in the housing 1 is such that the second end of the valve 4 is lifted away from the base of the housing 1 by an increase in pressure within the space 6.

In the embodiment depicted in FIGS. 1a and 1b, the housing includes stop means in the form of a protuberance 9 which partially obstructs the bore of the housing 1. This has the effect of delimiting the movement of the valve 4 away from the base of the housing 1, thereby preventing undue displacement of the valve 4.

In FIG. 1a the condition is depicted in which the space 6 between the second end of the valve 4 and the base of the housing 1 is quite small. Fluid entering the regulator through inlet 2 cannot pass through the valve 4 because the through-conduit 8 is not aligned with the inlet 2 and the outlet 3. The fluid upstream of space 6 therefore communicates through conduit 7 with space 6. As more fluid pressure builds up upstream of the space 6, the pressure within space 6 increases to the point at which valve 4 is shifted away from the base of housing 1.

In FIG. 1b, the situation is depicted for a back-pressure regulator in which inlet 2, outlet 3 and through-conduit 8 are in a state of near-perfect alignment, thus allowing passage of fluids through the back-pressure regulator. Of course, the inlet 2, the through-conduit 8 and the outlet 3 do not have to be in perfect alignment for passage of fluids to be possible. Partial alignment is all that is required and, in some embodiments of the invention, special geometries may be applied to the inlet 2, the through-conduit 8 and/or the outlet 3 in order to achieve maximum sensitivity of the device when only partial alignment is achieved. Such features will be described in more detail below.

FIG. 1c is a cross-section of the back-pressure regulator from above showing the alignment of the inlet 2, through-conduit 8 and outlet 3, in which condition through-passage of fluids is possible.

FIG. 1d is a side view of the valve 4 of FIG. 1a shown from a side-view perspective. Visible in FIG. 1d is a portion of valve 4 and through-conduit 8. Through-conduit 8 is shown as having a polygonal cross-sectional shape, with an apex 21 of the polygon directed towards the pressure setting means denoted by arrow 5 in FIGS. 1a–1c. As further described herein below by positioning the apex 21 of the polygonal cross-sectional shape towards the pressure setting means, it is possible to achieve fine-tuning of flow in through-conduit 8.

In FIG. 2, an alternative embodiment of pressure regulator is depicted, in which the valve 4 is mounted inside the housing 1 for rotary movement rather than reciprocal movement.

As shown in FIG. 2a, the valve 4 is mounted in the housing 1 in a condition in which the through-conduit 8 is at the same level as the inlet 2 and the outlet 3. That is to say, the inlet 2, the outlet 3 and the through-conduit 8 are each the same distance from the base of the housing 1. Valve 4 is prevented from longitudinal displacement relative to the housing 1 by plug means 10. A passageway for fluids is established through the valve when inlet 2, through-conduit 8 and outlet 3 are in alignment. This occurs when the pressure in space 6 has reached a level which causes rotation of the valve 4 against the counter-pressure exerted by the pressure setting means which is denoted by arrow 5.

The first end of valve 4 butts against plug means 10. The second end of the valve 4 is formed with a bluff face having a paddle portion 4a extending therefrom. The paddle portion 4a is mounted between two bearing points formed by radially-inwardly directed extensions of the housing 1. A space 6 is provided between the bluff face of the second end of valve 4 and a base of the housing 1. A conduit 7 extends in open communication between the inlet 2 and space 6.

The rotary position of the paddle portion 4a of the valve 4 relative to the housing 1 is determined by the difference between the pressure of the fluid entering inlet 2 and passing through conduit 7 into the space 6 on one side of the paddle portion 4a and the counter-pressure 5 exerted by the pressure setting means against the other side of the paddle portion 4a.

Figure 2C:
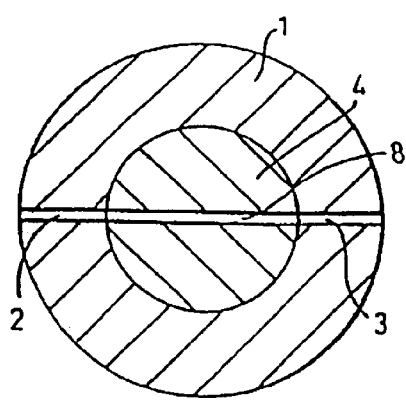
FIG. 2c is a cross-sectional view from above of the embodiment depicted in FIG. 2a in its open condition.

In the condition shown in FIG. 2c, which is a cross-sectional of view of the pressure regulator according to the second embodiment of the invention viewed from above, valve 4 has been rotated into a position in which inlet 2, through-conduit 8 and outlet 3 are in perfect alignment so that a passageway is formed enabling fluids to pass through the valve.

Figure 2D:
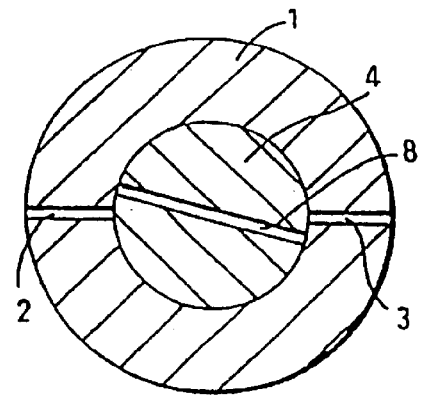
FIG. 2d is a cross-sectional view from above of the embodiment depicted in FIG. 2a in its closed condition.

In the condition depicted in FIG. 2d which is a similar cross-sectional view from above of the second embodiment of pressure regulator according to the invention, the counter-pressure 5 delivered against the paddle portion 4a of the valve 4 is greater than the pressure of fluid passing through inlet 2. In this condition, the rotary valve 4 is displaced slightly from the condition depicted in FIG. 2c, so that no through-passage exists through the valve. Fluids are unable to pass through the valve and it is said to be in a closed condition.

Figure 3:
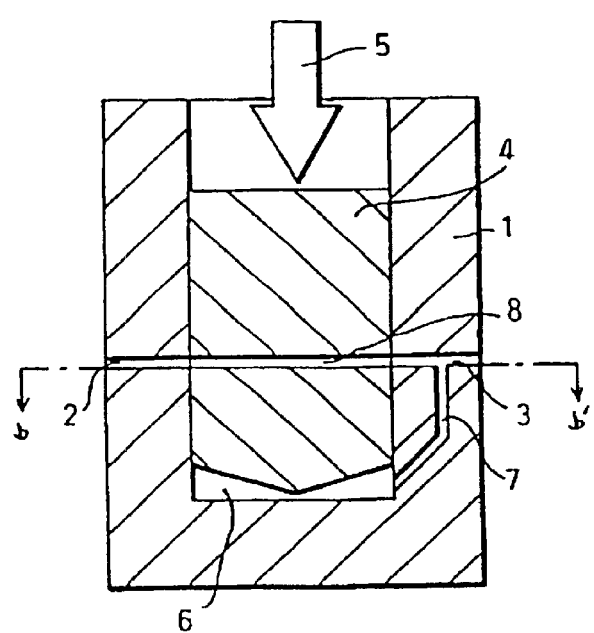
FIG. 3a is a cross-sectional view through a third embodiment of the invention, shown in its open condition.
FIG. 3b is a cross-sectional view of the embodiment depicted in FIG. 3a shown in its closed condition.
FIG. 3c is a view from above of the embodiment depicted in FIG. 3a shown in the open condition.
Figure 3:
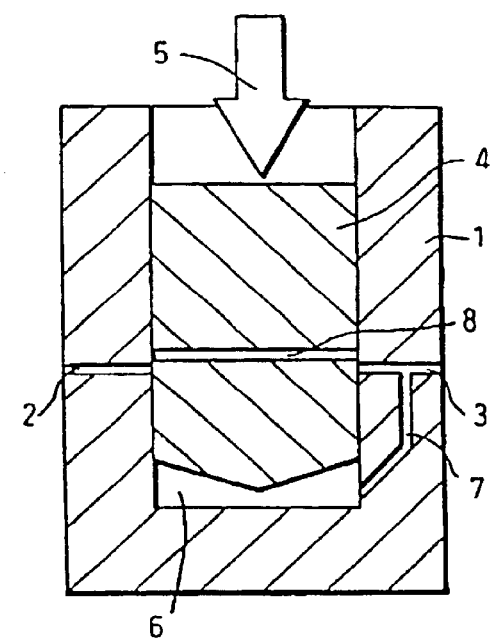
Figure 3:
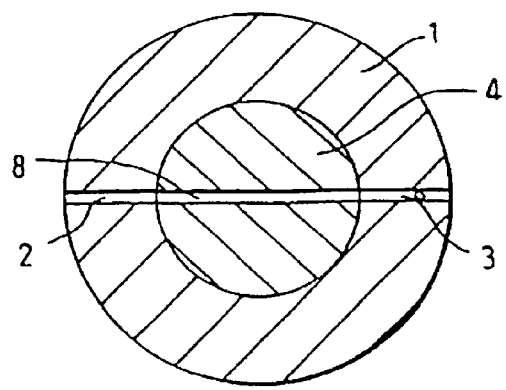

FIG. 3 depicts yet another embodiment of the invention which operates on essentially the same principle as the back-pressure regulator depicted in FIG. 1.

FIG. 3a, the same reference numerals are used to denote common features that were also used above in describing the first embodiment depicted by FIG. 1.

By reference to FIG. 3a, it will be seen that conduit 7 is in open communication between the outlet 3 and the space 6 formed between the second end of the valve 4 and the base of the housing 1. FIG. 3c is a cross-sectional view from above of the third embodiment of pressure regulator according to the invention. FIGS. 3a and 3c show the pressure regulator in the open condition, in which inlet 2, through-conduit 8 and outlet 3 are in alignment, thereby allowing passage of fluids through the pressure regulator.

FIG. 3b is a view similar to FIG. 3a, but showing the valve 4 displaced away from the base of the housing 1, thereby closing the pressure regulator. This condition arises when the pressure in the system downstream of outlet 3 is such that fluid is caused to flow through conduit 7 into space 6. This causes a pressure build-up in space 6 which acts against the pre-determined force denoted by arrow 5 exerted by the pressure setting means. When the force exerted by the pressure setting means is exceeded, the valve 4 is displaced away from the base of the housing 1 so that the inlet 2, through-conduit 8 and outlet 3 are no longer in alignment and the passage through the fluid regulator is closed off. When the pressure in the system downstream of outlet 3 subsides, fluid is expelled from space 6 through conduit 7 by the restoring force denoted by arrow 5 exerted by the pressure setting means.

The valve 4 returns from its displaced position to its position at the base of the housing 1, in which inlet 2, through-conduit 8 and outlet 3 are in alignment, thereby permitting transport of fluids through the pressure regulator.

In essence, the (back)-pressure regulator device according to the present invention allows pressure control at small flow rates of fluids (expressed as a certain volume per unit time, for rapid screening purposes normally expressed as ml/minute) in a system and will close off the throughput in the event that pressure levels are reached below pre-determined values. The pressure regulator maintains itself in its displaced condition (which may be partially open, fully open or closed, according to the circumstances of a particular application) until the proper levels of fluid pressure in the system have been restored. If higher pressures are to be regulated by the invention, the pre-determined force exerted by the pressure setting means and denoted by arrow 5 is adjusted accordingly.

It will be apparent to persons skilled in the art that the shape and length of the conduit 7 in open communication with one of the inlet 2, outlet 3 or through-conduit 8 and a space 6 formed between one end of the valve 4 and a base of the housing 1 can vary in may ways, as long as it is capable of being in open communication with the space 6 in order to maintain the self-regulating capability of the (back)-pressure regulator. The first embodiment as depicted in FIG. 1a is a convenient way of portraying the conduit, i.e. as a downward-sloping tube, but other configurations can be used in the alternative. For example, the communicating path need not be a conduit 7 as shown in the embodiments depicted by FIGS. 1 to 3, but could be a channel formed on the inside surface of the housing 1 and extending from the inlet 2 or the outlet 3 to the base of the housing. Alternatively, it could be a groove formed on the outside surface of the valve 4 and extending from a point beyond one end of the through-conduit 8 to the end of the valve 4 that delimits the space 6. The extent to which the groove extends beyond the end of the through-conduit 8 is determined by the extent of the displacement of the valve 4 as it moves between the open and closed positions.

Although not explicitly illustrated in the embodiments discussed above in relation to FIGS. 1 and 3, it will be understood by persons skilled in the art that some kind of keying mechanism may be provided in the regulator to prevent relative rotational movement between the valve 4 and the housing 1 as they undergo relative longitudinal movement. Such keying mechanisms are known and need not be described in detail in this document. However, in the variant of the present invention in which the communicating path to the space 6 is a channel provided on the inner surface of the housing 1 and/or on the outer surface of the valve 4, it is possible to combine a keying feature with the channel. This simplifies the construction of the pressure regulator and reduces to a minimum the number of machining steps that are required during its manufacture.

The function of the conduit 7 is to provide a communicating path between the space 6 and the fluid stream passing, or attempting to pass, through the valve 4. The conduit 7 may therefore be provided through the body of the valve 4 provided that it is possible for fluid to enter the through-conduit 8 through one of the inlet 2 or the outlet 3 without being able to exit until the valve 4 is displaced. This requires that the opening at the end of said inlet 2 or outlet 3, as the case may be, is enlarged in the longitudinal direction or the circumferential direction, according to whether the valve 4 has a reciprocating or rotary action.

An example of this type of arrangement is illustrated in FIG. 4, in which the same reference numerals are used to denote common features that were also used above in describing the embodiments depicted by FIGS. 1 to 3.

In FIG. 4a, the regulator is shown in cross-section with valve 4 in the closed condition. Fluid entering the regulator through the inlet 2 passes into through-conduit 8 via enlarged opening 2a at the end of inlet 2, but cannot leave the regulator because outlet 3 is not aligned with through-conduit 8. The fluid therefore passes from through-conduit 8 along conduit 7 and enters space 6. As a higher fluid pressure builds up through fluid entering the space 6, the pressure within space 6 increases to the point at which valve 4 is displaced away from the base of the housing 1, against the pre-set force denoted by arrow 5 exerted by the pressure setting means.

In FIG. 4b, the regulator is depicted in cross-section with valve 4 in the open condition, in which inlet 2, through-conduit 8 and outlet 3 are in near perfect alignment. This allows passage of fluids through the regulator. When a sufficient volume of fluid has passed through the regulator to relieve the pressure build-up in space 6, the pre-set force denoted by arrow 5 exerted by the pressure setting means urges the valve 4 back towards the base of the housing 1 and restores the regulator to the closed condition.

The conduit 7 is shown slightly offset from the centre of the valve 4. This ensures that the opening of conduit 7 into space 6 is not closed off if the valve 4 is resting on the base of the housing 1.

It has been found that different shapes and sizes of conduit can be used to adjust the sensitivity of the device according to the invention. For example, by adjusting the geometry of through-conduit 8, greater control of pressure regulation can be achieved. For instance, if the cross-sectional shape of through-conduit 8 is polygonal with one of the apexes 21 of the polygon directed towards the pressure setting means denoted by arrow 5, it is possible to achieve fine-tuning of flow, since a relatively small through-opening is created when through-conduit 8 first becomes partially aligned with inlet 2 and outlet 3, in response to an initial change in pressure in space 6. Preferably, the polygon is a triangle and one of the points of the triangle is directed towards the pressure setting means.

It will be appreciated that the (back)-pressure regulator according to the present invention will be coupled in practice to the appropriate auxiliary equipment such as attachments at the outside ends of inlet 2 and outlet 3 enabling connection with the reactor system for which the (back)-pressure regulator is operative. For example, inlet 2 may be connected to the conduit leaving a reactor, whilst outlet 3 is connected to a conduit leading to the section of the system where work-up and/or analysis is carried out. It will also be apparent to the person skilled in the art that the (back)-pressure regulator according to the present invention is adapted to be coupled to suitable means to provide the (adjustable) force for controlling or fine tuning the pressure that is maintained by the system. This may be by means of screws, clamps or otherwise which have not been shown in the drawings, for the purposes of clarity.

As discussed above when describing the embodiments depicted in FIGS. 1 and 3, it is possible to use the same basic concept for the preferred back-pressure regulator as a normal pressure regulator, when inlet and outlet flows are reversed.

The pressure regulator according to the invention may be used as a differential pressure regulator. In the first and second embodiments described above and illustrated in FIGS. 1 and 2, respectively, this can be done by connecting the outlet 3 with the pressure setting means. If the pressure setting means is a spring (a torsional spring in the case of the rotary acting valve), the force denoted by the arrow 5 then becomes a combination of the spring return force and the fluid pressure exerted through outlet 3. Similarly, in the third embodiment described above and illustrated in FIG. 3, differential pressure regulation is achieved by connecting inlet 2 with the pressure setting means. By this means, the pressure regulator can be made to regulate a pressure difference between the upstream and downstream parts of the system. Otherwise, pressure regulation is carried out relative to the ambient system pressure, usually one atmosphere, experienced outside the regulator.

It has been found that the (back)-pressure regulator according to the invention not only allows for quick and accurate control in which the flow is essentially in one phase, being either essentially gaseous or essentially liquid, but also in situations in which the flow is dual-phase, i.e. in systems in which both gaseous and liquid components contribute to the fluid. In referring to essentially gaseous or essentially liquid in defining the single phase mode above, it will be understood that the gaseous or liquid phase contains, at most, insignificant amounts of the other phase as the case may be. This refers to the circumstances in which a "wet" gas is defined as a single phase, or to circumstances in which a liquid containing dissolved gases is, similarly, referred to as a single phase. The major advantage of the (back)-pressure regulator according to the invention is that it is capable of dealing with fluids containing both gaseous and liquid components. This is true, even in situations operating at low flow regimes, such as flow regimes of 5 ml/minute, or even less. Operation at such low flow regimes in two-phase flow systems cannot be achieved with equipment available prior to the making of the present invention. In particular, it is pointed out that flow regimes between 0.1 and 20 ml/minute can be controlled by the (back)-pressure regulator according to the invention. In other words, the pressure regulator according to the invention has a large dynamic range. Because of this characteristic, the pressure regulator according to the invention can switch in a very short time between a position of being closed or only fractionally open, i.e. having a very small through-path, to a position in which it has established the maximum opening available, especially in an operational mode in which the fluid contains both gas and liquid. The (back)-pressure regulator according to the invention can be used advantageously in systems designed to operate in an environment envisaged for combinatorial chemistry.

A further advantage of the (back)-pressure regulator according to the present invention is that it is capable of operating in a leak-tight mode. This can be achieved by machining the housing 1 and the valve 4 with a sufficient measure of accuracy that they perform leak-tight operation of their own accord, even at elevated temperature and pressure. This is best achieved with a housing 1 and valve 4 made from the same material, or from materials having matching thermal coefficients. Temperatures of up to 300° C. and pressures of up to 20 MPa (200 bar) can be tolerated using the (back)-pressure regulator according to the present invention. As an alternative to precision machining, which can be rather expensive and may sometimes be difficult to achieve, it is possible to provide the inside of the housing 1 or the outside of the valve 4 with a suitable coating which allows smooth operation of the valve, i.e. without sticking, whilst maintaining the leak-tight condition discussed above. For example, the housing 1 may have a lining of an engineering plastics, such as poly-tetrafluoroethylene (e.g.TEFLON, registered trademark). This can be applied at conditions of up to 200° C. and 30 MPa (300 bar). Alternatively, the valve 4 can be supplied with a collar of engineering plastics material. The outer diameter of the collar of engineering plastics material can be made adjustable by providing a series of longitudinally-extending bores through the valve and means such as threaded fasteners positioned in the bores which act as tie-rods and may be adjusted to compress or stretch the collar, as appropriate, to adjust its external diameter in order to achieve a perfect fit in the housing 1.

Yet another important advantage of the (back)-pressure regulator according to the invention is that it can be operated in any orientation. For example, it can be operated in the upright orientation as depicted in FIG. 1a, upside down, in which it would be inverted in relation to the orientation depicted in FIG. 1a, as well as sideways or tilted at any angle between these variants. This provides an enlarged window of operation in relation to many known pressure regulators. Advantageously, if the pressure regulator according to the present invention is operated in the upright orientation as depicted in FIG. 1a, any liquid that may be present in a two-phase fluid system tends to accumulate in the space 6, thereby minimising the "dead" space associated with the valve. Compared to known pressure regulators, the "dead" space associated with the pressure regulator according to the invention is already small. Operation of the device in the upright orientation with a two-phase fluid system results in even less "dead" space and therefore more effective operation.

Alternatively, an advantage of operating the pressure regulator according to the invention in an inverted mode is that clogging of the conduit 7 and space 6 is minimised.

In the alternative, the pressure regulator according to the present invention may be operated in an orientation which is such that the fluid flow along through-conduit 8 is in a generally downward direction, as this contributes to the normal direction of fluid flow.

It will be apparent to persons skilled in the art that the various orientations of the pressure regulator according to the invention, along with their attendant advantages, are attainable because of the leak-tight nature of the pressure regulator.

The (back)-pressure regulator can be made of any suitable material. Preferably, it is made of steel, in particular of stainless steel, but other materials can also be used, such as a low thermal coefficient iron/nickel alloy, for example Invar. In a particularly preferred form of the invention, a major proportion or the entire valve 4 may be formed of an engineering plastics material such as polytetrafluoroethylene. The housing 1 may be formed of stainless steel.

The means to provide the required pre-determined pressure denoted by the arrow 5 in the drawings are well-known to those skilled in the art and are not described in detail in this specification. In FIGS. 1a and 1b, bellows 20 are depicted as part of an exemplary bellows-driven pressure regulating valve. Examples of bellows-driven pressure regulating valves can be found in U.S. Pat. Nos. 4,619,115; 4,682,622 and 4,971,104. It is also possible to create and control the force by direct pressure.

The present invention also relates to a process for regulating the (back)-pressure of a reactor system using a fluid (back)-pressure regulator comprising a housing provided with an inlet and an outlet for fluids, a valve located movably inside the housing and provided with transport means to allow passage of fluids from said inlet to said outlet, a pressure setting means and a conduit in open communication between one of said inlet, said outlet and said transport means and a space defined between one end of the valve and a base of the housing, in which process a pre-set pressure is maintained by setting the pressure such that, under non-perturbing conditions, a constant pressure within the system is sustained whilst, under conditions deviating from the pre-set conditions, the valve is caused to respond to the deviations by changing the flow rate through the passageway formed by the inlet, the transport means and the outlet.

In essence, the process according to the present invention allows compensation for changes in pressure compared with the pre-set pressure caused by the system. This change, in its turn, causes a change in the pressure in space 6 by virtue of fluid entering the space through conduit 7. The space 6 is enclosed between one end of the valve 4 and the base of the housing 1 and a change in the volume of the space 6 triggers the required compensating change in the flow rate through the pressure regulator. The mechanism by which the system operates can be defined as self-regulating. This is advantageous in that there is no need to apply electronic equipment, such as PID devices, as the system is intrinsically robust and reliable.

The (back)-pressure regulator according to the invention is suitable for use in small-scale operations, since it meets the critical parameters therefor, such as leak-tightness and low dead volume. In particular, under conditions of using a fluid containing both gaseous and liquid components, it has a large dynamic range. Moreover, it can be used advantageously in situations in which use is made of reactor vessel arrays in which a number of (different) physical and/or chemical operations can be performed, either simultaneously or sequentially.

The desirability of performing a multitude of operations in a short time is well-known to those skilled in the art. A number of systems have already been proposed, some of which are commercially available, to decrease the time in which physical and/or chemical operations have to be performed. Developments in this area are also allowing ever smaller samples to be handled. However, there is still room for improvement in carrying out operations at elevated temperature at pressure in reactor vessel arrays. In this respect, reference is made to the applicant's co-pending international patent application no: PCT/GB00/02501 which is concerned with processes carried out at elevated temperature and pressure in reactor vessel arrays. The (back)-pressure regulator according to the present invention is eminently suitable for use in the reactor systems described and defined in the aforementioned international patent application.

Because the (back)-pressure regulator according to the present invention can be produced to a very small scale, in particular, occupying a volume of less than 100 cm$^3$, it can be used advantageously in multiple reactor vessel array systems, as its size is so small that this is not restrictive with regard to the number of the regulators required. Also, the low cost of the pressure regulator according to the invention makes it attractive in applications where several regulators are required.

In an array of reactors, individual control of each reactor is possible by individually controlling its respective pressure regulator. Also, it is possible to control all the pressure regulators in an array using a single pressure line as the pressure setting means. This is particularly advantageous in combinatorial chemistry, for example.

It is also possible to make use of a number of (back)-pressure regulators pre-set at different levels to operate at different pressures whilst feeding the reactor vessels in the array with a fixed pressure. This allows the option of performing a series of experiments at different pre-set pressure levels, which is highly advantageous in combinatorial chemistry.

Although the invention has been particularly described above with reference to specific embodiments, it will be understood by persons skilled in the art that modifications and variations are possible without departing from the scope of the claims which follow.

What is claimed is:

1. A fluid pressure regulator comprising:
   a housing having a fluid inlet, a fluid outlet and an end wall;
   a valve positioned inside the housing wherein an end of the valve and the end wall of the housing define a space therebetween, wherein said valve is movable relative to said housing rotatably;
   fluid transport means provided in the valve;
   pressure setting means; and
   a passage in open communication between said space and one of said inlet, said outlet, and said transport means, wherein the valve is moveable relative to the housing in response to a change in pressure within said space between a first position which at least partially aligns the fluid transport means with each of said inlet and said outlet and a second position in which there is no alignment of the fluid transport means with at least one of said inlet and said outlet.

2. A regulator according to claim 1, wherein the transport means comprises a through-conduit provided through the valve and extending between said inlet and said outlet.

3. A regulator according to claim 1, wherein the valve is caused to move in response to an increase in the volume of the space caused by an influx of fluid through the passage.

4. A regulator according to claim 1, wherein the passage is in open communication with said inlet and in which movement of the valve in response to an increase in pressure within the space causes the valve to a displaced to a position which allows fluids to pass through the valve from the inlet to the outlet.

5. A regulator according to claim 1, wherein the passage is in open communication with said outlet and in which movement of the valve in response to an increase in pressure within the space causes the valve to be displaced to a position which closes off fluid communication between said inlet and said outlet.

6. A regulator according to claim 1, wherein leak-tight operation is achieved by means of a coating or lining on at least one of the housing interior or valve exterior.

7. A regulator according to claim 1, wherein leak-tight operation is achieved by means of a coating or lining of an engineering plastics material on at least one of the housing interior or valve exterior.

8. A regulator according to claim 1, wherein at least a major proportion of the valve is formed of an engineering plastics material.

9. A regulator according to claim 7 in which the engineering plastics material is polytetra-fluoroethylene.

10. A fluid pressure regulator comprising:
    a housing having a fluid inlet, a fluid outlet and an end wall;
    a valve positioned inside the housing wherein an end of the valve and the end wall of the housing define a space therebetween, wherein said valve is movable relative to said housing rotatably;
    fluid transport means provided in the valve;
    pressure setting means comprising a bellows-driven system; and
    a passage in open communication between said space and one of said inlet, said outlet, and said transport means, wherein the valve is moveable relative to the housing in response to a change in pressure within said space between a first position which at least partially aligns the fluid transport means with each of said inlet and said outlet and a second position in which there is no alignment of the fluid transport means with at least one of said inlet and said outlet.

11. A fluid pressure regulator comprising:
    a housing having a fluid inlet, a fluid outlet and an end wall;
    a valve positioned inside the housing wherein an end of the valve and the end wall of the housing define a space therebetween, wherein said valve is movable relative to said housing rotatably;

fluid transport means provided in the valve comprising a conduit through the valve having a polygonal cross-section;

pressure setting means; and a passage in open communication between said space and one of said inlet, said outlet, and said transport means, wherein the valve is moveable relative to the housing in response to a change in pressure within said space between a first position which at least partially aligns the fluid transport means with each of said inlet and said outlet and a second position in which there is no alignment of the fluid transport means with at least one of said inlet and said outlet.

12. A fluid pressure regulator comprising:

a housing having a fluid inlet, a fluid outlet and an end wall;

a valve positioned inside the housing wherein an end of the valve and the end wall of the housing define a space therebetween, wherein said valve is movable relative to said housing rotatably;

pressure setting means;

fluid transport means provided in the valve a conduit through the valve having a polygonal cross-section with apexes, and wherein one of the apexes of the polygon is positioned in a direction towards the pressure setting means; and a passage in open communication between said space and one of said inlet, said outlet, and said transport means, wherein the valve is moveable relative to the housing in response to a change in pressure within said space between a first position which at least partially aligns the fluid transport means with each of said inlet and said outlet and a second position in which there is no alignment of the fluid transport means with at least one of said inlet and said outlet.

13. A method of regulating the pressure of a reactor system using at least one pressure regulator which comprises:

a housing having a fluid inlet and a fluid outlet;

a valve positioned within the housing, wherein said valve is movable relative to said housing rotatably;

fluid transport means provided in the valve;

pressure setting means; and a space between one end of the valve and a base of the housing;

wherein the valve is moveable relative to the housing in response to a change in volume of said space, the method comprising:

setting a pressure value using the pressure setting means, and allowing a reaction process to take place in the reactor system under normal operating conditions of temperature and pressure, wherein said valve is caused to move between a first position which at least partially aligns the fluid transport means with each of said inlet and said outlet and a second position in which there is no alignment of the fluid transport means with at least one of said inlet and said outlet by permitting entry of fluid into said space through a passage in open communication between said space and one of said inlet, said outlet and said transport means.

14. A method as claimed in claim 13 in which the fluid is comprised of both liquid and gaseous components.

15. A method as claimed in claim 13 in which the flow rate through the pressure regulator is not more than 5 ml/minute.

16. A method as claimed in claim 15 wherein the flow rate through pressure regulator is between 0.5 and 2 ml/minute.

17. A method as claimed in claim 13 in which the regulator is operated at a temperature of up to 300° C.

18. A method according to claim 13 in which the regulator is operated at a pressure of up to 20 MPa (200 bar).

19. A method as claimed in claim 13 which is carried out under leak-tight conditions.

20. A method as claimed in claim 13 in which the pressure regulator is a back-pressure regulator.

21. A method as claimed in claim 13 in which the regulator is operated upside down or sideways.

22. A method of regulating the pressure of a plurality of operations of a reactor system in a short time at elevated temperature and pressure in a reactor vessel array, in which the pressure is regulated using at least one pressure regulator which comprises:

a housing having a fluid inlet and a fluid outlet;

a valve positioned within the housing, wherein said valve is movable relative to said housing rotatably;

fluid transport means provided in the valve;

pressure setting means; and a space between one end of the valve and a base of the housing;

wherein the valve is moveable relative to the housing in response to a change in volume of said space, the method comprising:

setting a pressure value using the pressure setting means, and allowing a reaction process to take place in the reactor system under operating conditions of elevated temperature and pressure, wherein said valve is caused to move between a first position which at least partially aligns the fluid transport means with each of said inlet and said outlet and a second position in which there is no alignment of the fluid transport means with at least one of said inlet and said outlet by permitting entry of fluid into said space through a passage in open communication between said space and one of said inlet, said outlet and said transport means.

23. A method according to claim 22 in which use is made of one or more back-pressure regulators.

24. A back-pressure fluid pressure regulator comprising:

a housing having a fluid inlet, a fluid outlet and an end wall;

a valve positioned inside the housing wherein an end of the valve and the end wall of the housing define a space therebetween, and wherein said valve is movable relative to said housing rotatably;

fluid transport means provided in the valve;

pressure setting means; and a passage in open communication between said space and one of said inlet, said outlet, and said transport means, wherein the valve is moveable relative to the housing in response to a change in pressure within said space between a first position which at least partially aligns the fluid transport means with each of said inlet and said outlet and a second position in which there is no alignment of the fluid transport means with at least one of said inlet and said outlet.

25. A back-pressure fluid pressure regulator comprising:

a housing having a fluid inlet, a fluid outlet and an end wall;

a valve positioned inside the housing wherein an end of the valve and the end wall of the housing define a space therebetween and having a paddle extending from said valve into said space;

fluid transport means provided in the valve;

pressure setting means; and a passage in open communication between said space and one of said inlet, said outlet, and said transport means, wherein the valve is rotatably moveable relative to the housing in response to force exerted upon said paddle by a change in pressure within said space between a first position which at least partially aligns the fluid transport means with each of said inlet and said outlet and a second position in which there is no alignment of the fluid transport means with at least one of said inlet and said outlet.

* * * * *